Figure 1:
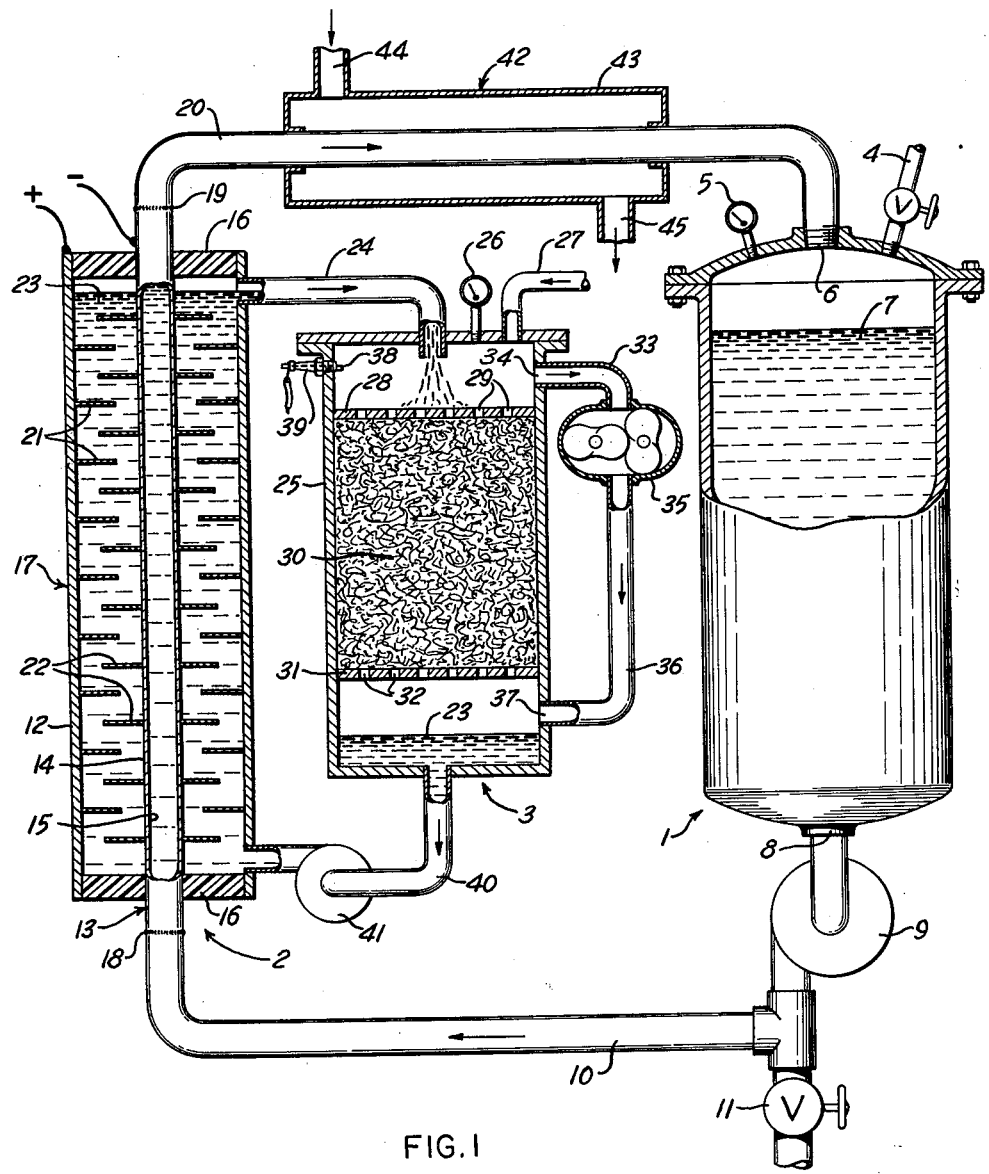

March 5, 1963  O. E. ANDRUS  3,080,304
PROCESS AND APPARATUS FOR REDUCING THE APPLIED POTENTIAL
REQUIREMENT OF A HYDROGEN CHARGING CELL
Filed May 22, 1961

INVENTOR.
Orrin E. Andrus
BY
Andrus & Starke
Attorneys

United States Patent Office 3,080,304
Patented Mar. 5, 1963

3,080,304
PROCESS AND APPARATUS FOR REDUCING THE APPLIED POTENTIAL REQUIREMENT OF A HYDROGEN CHARGING CELL
Orrin E. Andrus, Shorewood, Wis., assignor to A. O. Smith Corporation, Milwaukee, Wis., a corporation of New York
Filed May 22, 1961, Ser. No. 111,812
5 Claims. (Cl. 204—129)

This invention relates to a method and apparatus for electrolytically charging the metal-hydrogen alloy diaphragm of a hydrogen-charging cell with hydrogen.

In particular this invention relates to a method and process for reducing the electrical energy required to operate an electrolytic hydrogen-charging cell used to charge a metal-hydrogen alloy diaphragm for a predetermined rate of hydrogen diffusion through the diaphragm by rapidly circulating within the charging cell an electrolyte in which hydrogen gas is dissolved under pressure.

The method of this invention when applied to an electrolytic cell used for the hydrogen charging of a metal-hydrogen alloy diaphragm will eliminate or greatly lessen the evolution of oxygen gas at the anode surface and to a lesser extent the hydrogen gas at the cathode surface by maintaining the electrolyte which is momentarily in contact with the electrode surfaces under substantially hydrogen-gas-saturated conditions at a predetermined hydrogen gas pressure.

The process and apparatus of the instant invention will serve to provide a means for substituting in whole or in part for the energy of electrochemical decomposition of water the use of a cheap source of hydrogen gas. It also makes possible the formation of high concentrations of atomic hydrogen within an alloy diaphragm without the exceedingly high pressures required to accomplish the charging of an alloy diaphragm to a comparable concentration when using pressurized hydrogen without electrochemical assistance.

In operating electrolytic processes utilizing electrolytic cells of the type for example, described in my co-pending applications, Serial No. 111,815 entitled, "Continuous Decontamination of the Hydrogen Acquiring Surface of a Palladium Diaphragm Used for the Transfer of Atomic Hydrogen" and Serial No. 111,814 entitled, "The Application of a Continuously Hydrogen Charged Metal-Hydrogen Alloy Diaphragm as a Non-Destructible and Non-Gassing Anode in an Electrolytic Cell" both of which employ a hydrogen-metal alloy diaphragm as the cathode of an atomic hydrogen transfer medium, the generation of oxygen gas at the anode surface of the hydrogen-charging cell is generally not desirable nor economical.

The energy requirement for electrochemically producing atomic hydrogen is the product obtained by multiplying the ampere-hours required per unit weight of hydrogen by the actual potential required at the terminals of the hydrogen-charging cell. If the actual potential required is reduced by depolarizing the anode surface with hydrogen gas dissolved in the electrolyte, the energy requirement will be reduced accordingly. This is due to the fact that the ampere-hours required per unit weight of hydrogen produced is a constant in accord with Faraday's law.

In applications requiring the use of metal-hydrogen alloy diaphragms having a high concentration of atomic hydrogen, it is generally desirable to decrease the conversion of atomic hydrogen to molecular hydrogen gas at the atomic hydrogen acquiring surface of the diaphragm.

Factors retarding hydrogen gas conversion at the hydrogen-acquiring surface of the diaphragm include: The absence of contamination on the hydrogen-acquiring surface; the maintenance on the acquiring surface of hydrogen concentrations below alloy saturation; the use of optimum temperatures; and the application of higher hydrogen gas pressures within the electrolytic hydrogen-charging cell. Although it is possible to employ hydrogen gas pressures within the electrolytic hydrogen-charging cell sufficient to completely prevent conversion of atomic hydrogen to molecular hydrogen gas at the diaphragm surface, both the cost and danger may be high. Usually it is most practical to employ means to saturate and circulate the electrolyte under a moderate hydrogen gas pressure sufficient to prevent oxygen evolution within the charging cell and thereby simultaneously retard to some degree the conversion of atomic hydrogen to molecular hydrogen at the charging surface of the diaphragm. The determination of the optimum hydrogen gas pressure to be used in electrolytic charging cell and the optimum rate of electrolyte circulation is an economic problem in which the equipment and operating costs for pressurizing and circulating must be balanced against the gain in electrochemical cell energy saved.

In research leading to the development of the instant invention, it was discovered that the evolution of hydrogen and oxygen gases at their respective electrodes can be eliminated or greatly reduced and that the applied potential required for an established circuit can be reduced by maintaining the electrolyte contacting the anode surface of the hydrogen-charging cell in a condition of near saturation with hydrogen gas under pressure. To approach such a concentration of hydrogen gas in the electrolyte at the electrode surfaces, it is generally necessary to expose large surface areas of the electrolyte to hydrogen gas under pressure and it is necessary to cause the resulting charged electrolyte to flow past the anode surface under a high rate of turbulent flow.

The process and apparatus of this invention, therefore, provide a means for reducing the electrical energy requirements of an atomic hydrogen transmitting electrolytic cell and thereby afford operating economies not previously possible.

Various objects and advantages of the invention will hereinafter become more fully apparent from the following description of the drawing illustrating a presently preferred embodiment thereof and wherein:

FIGURE 1 is a schematic view of a hydrogenating device.

The hydrogenating device of FIGURE 1, in general, comprises a fluid reservoir 1 adapted to contain various reactants, a combined electrolytic hydrogen-charging cell and hydrogenation chamber 2 for the generation and consumption of atomic hydrogen, and a hydrogen gas absorption tower 3 for maintaining a near saturation condition of hydrogen gas in the electrolyte of the hydrogen-charging cell.

The reservoir 1 is provided with a valved inlet opening 4 through which a fluid charge may be introduced after the equipment has been purged to remove air and moisture. In order to control pressure in the system, a gage 5 is provided at the top of the reservoir. The top of the reservoir is provided with an opening 6 to receive wholly or partially hydrogenated fluid from the system. The reservoir is adapted to contain corn oil 7 or any other hydrogenatable materials in either a gaseous or liquid phase. Located at the bottom of reservoir 1 is an outlet opening 8 which is adjacent a pump 9. The pump 9 serves to establish a turbulent fluid flow in conduit 10 and within combined cell and chamber 2. To drain the contents of reservoir 1 on completion of the hydrogenation process, a discharge valve 11 is provided in communication with conduit 10.

The electrolytic cell 2 is provided with an outer generally cylindrical housing 12 which may be fabricated from nickel, nickel plated steel or other electrically conductive materials. Housing 12 surrounds a palladium diaphragm 13. Diaphragm 13 is in conduit form and is fabricated from substantially pure palladium although materials such as a palladium-silver alloy, a palladium-bearing material, or other electrically conducting material capable of alloying with and transmitting hydrogen may be substituted for the pure palladium in fabricating the diaphragm. The diaphragm 13 has a hydrogen-acquiring surface 14 and a hydrogen-emitting surface 15. A pair of electrically non-conducting plastic rings 16 are provided between housing 12 and diaphragm 13 at the ends of housing 12. The rings 16 are in liquid-tight engagement with both the housing and the diaphragm and act to provide a hydrogen-charging cell 17.

Initially the tubular palladium diaphragm 13 is welded at 18 to conduit 10 and at 19 to a conduit 20 so that the corn oil may be brought to and removed from the hydrogen-emitting surface 15 of the palladium diaphragm 13.

A number of disc-shaped baffles 21, which may be fabricated from nickel, nickel-plated steel or other suitable conductive materials, are attached in electrical contact to the inner surface of housing 12. The baffles 21 are spaced in generally horizontal alignment. A second group of disc shaped baffles 22, which may be fabricated from the same material from which diaphragm 13 is fabricated or from an insulating material such as plastic. The baffles 22 are spaced in generally horizontal alignment and out of electrical contact with baffles 21.

The housing 12 is filled with an electrolyte 23 such as an aqueous solution of sodium hydroxide. To provide an outlet for the electrolyte from the hydrogen generating cell 17, a tube 24 is positioned at the top of housing 12 in leak-tight engagement therewith and in communication with the electrolyte 23. Tube 24 empties into the hydrogen gas absorption tower 3.

In the gas absorption tower 3 the electrolyte 23 is brought to a state of saturation or near saturation with hydrogen gas. The tube 24 empties the aqueous electrolyte solution 23 into a generally cylindrical pressure container 25 which comprises a portion of the absorption tower 3. A pressure gage 26 is provided at the top of container 25 so that the internal container pressure may be observed and maintained at a desired level. A hydrogen gas inlet tube 27 is also located in the top of container 25 and in pressure-tight engagement therewith. Tube 27 extends from a source of substantially pure pressurized hydrogen gas (not shown) and acts to provide pressure container 25 with a constant supply of hydrogen gas at a predetermined pressure.

When the electrolyte 23 enters container 25, a circular perforated plate 28, which is supported within container 25 near its top acts to prevent channeling of the electrolyte as it descends within the container. Thus the electrolyte 23 is distributed evenly across the container as it flows through the perforations 29 in the plate. A packing material 30, which may consist of Raschig rings, balls or other shapes made of materials inert to the particular electrolyte employed, is supported above the bottom portion of container 25 by a second perforated plate 31 which is welded to the container. The electrolyte 23 may gravitate through the packing 30 and pass through perforations 32 in plate 31.

To insure maximum gas saturation of the electrolyte, a conduit 33 is provided on the exterior of pressure container 25 and is in communication with the interior of the container above plate 28 at 34. A blower 35 is positioned at the bottom of conduit 33 and in pressure-tight relation therewith. A second conduit 36 is attached in pressure-tight relation to blower 35 and opens into container 25 below plate 31 at 37. This completes a hydrogen-gas circulation circuit whereby hydrogen gas may be forced by blower 35 from the top of the pressure container through conduits 33 and 36 to the bottom of the container 25 and then upward through perforations 32 in plate 31, packing 30, and perforations 29 in plate 28. A high concentration of hydrogen gas is thereby brought into intimate contact with a large surface area of electrolyte 23 as it flows in the opposite direction and insures maximum gas absorption by the electrolyte and a condition of hydrogen gas saturation or near saturation.

To avoid the potential danger of an explosion in pressure container 25 due to the contamination of hydrogen gas in the container with oxygen gas evolved from the hydrogen-charging cell 17, an electrically heated wire 38 connecting the terminals of a spark plug 39 is located within the upper portion of container 25. The heated wire 38 provides for the periodic or continuous ignition of any combustible mixture before dangerously explosive concentrations can accumulate.

Hydrogen-gas-saturated electrolyte 23 is discharged from pressure container 25 through tube 40 which opens into the bottom of the container. A pump 41 acts to establish a turbulent, as opposed to laminar, flow of the hydrogen-gas-saturated electrolyte in hydrogen-charging cell 17.

This completes the electrolyte circuit in which the electrolyte continuously cycles through the pressurized hydrogen absorption tower where it becomes re-saturated with hydrogen gas and then through the hydrogen-charging cell where it loses a portion of the absorbed hydrogen to the anode reactions.

After corn oil 7 has been subjected to hydrogenation in electrolytic cell 2, it is forced into discharge conduit 20 which passes through a conventional heat exchanger 42. Heat exchanger 42 comprises a hollow cylindrical shell 43 which encloses a portion of conduit 20. Shell 43 is provided with an inlet 44 to permit introduction of a heat-exchange medium into the tube and an outlet 45 for discharge of the medium.

Conduit 20 terminates at opening 6 in the top of reservoir 1 and discharges the partially or wholly hydrogenated corn oil 7 into the reservoir.

The hydrogenation process is generally carried out as a batch process at temperatures that will readily permit circulation of the reactants. In operating the apparatus as a batch process, temperature in the range of from ambient temperature to 400° F. may be employed in the hydrogenation of corn oil. The corn oil 7 is initially drawn from reservoir 1 and is forced through conduit 10 by the action of pump 9 and into the combined electrolytic hydrogen-charging cell and hydrogenation chamber 2. It is generally preferable with respect to the instant invention that a sufficient fluid velocity be established and maintained to cause a turbulent fluid flow within tubular diaphragm 13. Turbulence may also be established within diaphragm 13 by vibratory means. Such a turbulent fluid flow aids in insuring that the greatest possible fluid surface is exposed to hydrogenation in cell 2. The nickel housing 12 and baffles 21 are made anodic and the hydrogen-acquiring surface 14 of palladium tubular diaphragm 13 is made cathodic. It is believed that atomic hydrogen is generated electrolytically at the cathodically charged hydrogen-acquiring surface 14. The atomic hydrogen alloys with the palladium content of diaphragm 13 and is readily transmitted or diffused through the diaphragm to hydrogen-emitting surface 15. The corn oil 7 is brought into intimate contact with the highly reactive atomic hydrogen charged palladium-hydrogen alloy diaphragm 13 at the hydrogen-emitting surface 15 by the turbulent liquid flow. The palladium content of alloy diaphragm 13 at the emitting surface 15 acts catalytically to induce a reaction of the corn oil 7 with diffused atomic hydrogen to thereby partially or wholly hydrogenate the oil.

Ordinarily in an apparatus of this type, quantities of oxygen gas would be expected to be evolved at anode surfaces 12 and 21 simultaneously with the generation of atomic hydrogen at acquiring surface 14. In the operation of the apparatus of the instant invention, the formation of oxygen gas on the interior surface of anode 12 will be suppressed or prevented depending on the ratio of the rate at which hydrogen gas is brought to the anode surface and the rate hydrogen can be consumed at the anode surface as determined by the circuit current in the charging cell. The potential for oxygen formation may thus be reduced with a corresponding reduction in the power required for electrolytic charging of the diaphragm with atomic hydrogen. The addition of anode surface area by the use of conductive baffles 21 to substantially exceed the exposed surface area of the anode may aid to increase the rate at which hydrogen gas is brought to the anode surface 12. The addition of anode surface and the judicious spacing of the electrodes may reduce the electrical resistance of the electrolytic circuit and thereby afford additional energy reductions.

By continuously circulating electrolyte 23 through hydrogen-generating cell 17 and by continuously saturating the electrolyte with hydrogen gas in the absorption tower 3, a high concentration of hydrogen gas dissolved in the electrolyte is maintained in intimate contact with anode surfaces 12 and 21. By maintaining this concentration of hydrogen gas in the electrolyte at a substantially saturated level, oxygen gas evolution at the anode surface is essentially eliminated.

Also, in the operation of the apparatus of the invention, it may be advantageous to decrease the inefficiency of hydrogen absorption at the cathode surface 14. Although it may not be desirable to use as high a hydrogen gas partial pressure within the absorption tower 3 as the equilibrium pressure corresponding to the electrolytically charged palladium-hydrogen alloy on the cathode surface of the tubular diaphragm 13, the charging of the electrolyte with hydrogen gas can reduce the inefficiency of hydrogen absorption at the cathode surface to some extent and it can aid in reducing the potential and the energy required for atomic hydrogen generation at the cathode surface.

The corn oil 7, which is being continuously forced through tubular diaphragm 13 during the hydrogenation process, passes into heat exchanger 42 to reduce any excessive heat due to the hydrogenation reaction so that the most favorable temperature range may be maintained during recirculation. The partially or wholly hydrogenated corn oil is then returned to reservoir 1 and is again circulated through the system. This recirculation is continued until the desired degree of hydrogenation has been achieved. Upon completion of the batch process, the hydrogenated oil may be discharged by opening valve 11.

The disclosed method of applying high pressures to the hydrogen-charging cell also makes it possible to operate the apparatus at higher temperatures than would otherwise be possible.

Various modes of carrying out the invention are contemplated as being within the scope of the following claims particularly pointing out and distinctly claiming the subject matter which is regarded as the invention.

I claim:
1. A method of suppressing hydrogen gas evolution at the atomic hydrogen acquiring cathode of an electrically conductive atomic hydrogen transmitting alloy diaphragm in an atomic hydrogen generating electrolytic cell having an anode and an electrolyte, comprising cathodically generating atomic hydrogen at the hydrogen acquiring surface of the alloy diaphragm for transmission therethrough, continuously providing the electrolyte with a pressurized reducing gas to suppress the evolution of hydrogen gas at the hydrogen acquiring surface of the atomic hydrogen generating cell and to promote the absorption of atomic hydrogen thereby, and maintaining the reducing gas pressure within the generating cell whereby the electrical energy requirements of the electrolyte cell in generating and transmitting atomic hydrogen may be diminished.

2. A method of suppressing hydrogen gas evolution at the atomic hydrogen acquiring cathode of an electrically conductive atomic hydrogen transmitting alloy diaphragm in an atomic hydrogen generating electrolytic cell having an anode and an electrolyte, comprising cathodically generating atomic hydrogen at the hydrogen acquiring surface of the alloy diaphragm for transmission therethrough, substantially saturating the electrolyte with a pressurized reducing gas, continuously providing the electrolyte with the pressurized reducing gas to suppress the evolution of hydrogen gas at the hydrogen acquiring surface of the atomic hydrogen generating cell and to promote the absorption of atomic hydrogen thereby, and maintaining the substantial saturation of the electrolyte in the generating cell with the pressurized reducing gas whereby the electrical energy requirements of the electrolytic cell in generating and transmitting atomic hydrogen may be diminished.

3. A method of suppressing hydrogen gas evolution at the atomic hydrogen acquiring cathode of an electrically conductive atomic hydrogen transmitting alloy diaphragm in an atomic hydrogen generating electrolytic cell having an anode and an electrolyte, comprising cathodically generating atomic hydrogen at the hydrogen acquiring surface of the alloy diaphragm for transmission therethrough, substantially saturating the electrolyte with a pressurized reducing gas, flowing the substantially reducing gas saturated electrolyte into turbulent contact with the cathode surface of the generating cell to suppress the evolution of hydrogen gas at the hydrogen acquiring surface of the atomic hydrogen generating cell and to promote the absorption of hydrogen thereby, and maintaining the substantial saturation of the electrolyte in the generating cell with the pressurized reducing gas whereby the electrical energy requirements of the electrolyte cell in generating and transmitting atomic hydrogen may be diminished.

4. The method of claim 3 wherein the reducing gas comprises hydrogen gas.

5. A method of continuously supplying hydrogen to the hydrogen emitting surface of an electrically conductive hydrogen transmitting alloy diaphragm having a hydrogen acquiring cathode surface in an electrolytic cell having an anode and an electrolyte, comprising cathodically generating hydrogen at the acquiring cathode surface, transmitting the generated hydrogen through the alloy diaphragm to the emitting surface for discharge, substantially saturating the electrolyte with pressurized hydrogen gas, maintaining the electrolyte in a substantially hydrogen gas saturated condition, continuously flowing the substantially reducing gas saturated electrolyte into turbulent contact with the anode surface and the hydrogen acquiring cathode surface to continuously inhibit oxygen evolution at the anode and hydrogen gas evolution at the hydrogen acquiring cathode surface while atomic hydrogen is being generated at the acquiring cathode surface and transmitted through the alloy diaphragm to the emitting surface whereby the electrical energy requirements of the electrolytic cell are reduced during continuous operation.

References Cited in the file of this patent
UNITED STATES PATENTS 2,749,293     Wahlin                June 5, 1956

FOREIGN PATENTS 400,787       France                 June 24, 1909
1,166,831     France                 June 30, 1958